(12) United States Patent
Hedley et al.

(10) Patent No.: US 11,479,409 B2
(45) Date of Patent: Oct. 25, 2022

(54) STORAGE APPARATUS

(71) Applicant: JUSTOY PTY LIMITED, New South Wales (AU)

(72) Inventors: Robert Ian Hedley, New South Wales (AU); Christopher Nash Whybin, Queensland (AU)

(73) Assignee: JUSTOY PTY LIMITED, New South Wales (AU)

( * ) Notice: Subject to any disclaimer, the term of this patent is extended or adjusted under 35 U.S.C. 154(b) by 347 days.

(21) Appl. No.: 15/733,060

(22) PCT Filed: Oct. 30, 2018

(86) PCT No.: PCT/AU2018/051163
§ 371 (c)(1),
(2) Date: May 4, 2020

(87) PCT Pub. No.: WO2019/084599
PCT Pub. Date: May 9, 2019

(65) Prior Publication Data
US 2021/0094759 A1    Apr. 1, 2021

(30) Foreign Application Priority Data
Nov. 3, 2017   (AU) ................................ 2017904469

(51) Int. Cl.
*B65G 1/127*    (2006.01)
*B65G 1/02*     (2006.01)
(Continued)

(52) U.S. Cl.
CPC ............. *B65G 1/127* (2013.01); *B65G 1/026* (2013.01); *B65G 1/0442* (2013.01);
(Continued)

(58) Field of Classification Search
CPC .... B65G 1/026; B65G 1/0442; B65G 1/0457; B65G 1/127; B65G 17/123; B65G 17/18;
(Continued)

(56) References Cited

U.S. PATENT DOCUMENTS

| 940,793   | A | * | 11/1909 | Emerick | ............... | B65G 17/123 |
|           |   |   |         |         |                 | 198/797     |
| 1,639,435 | A | * | 8/1927  | Nilsson | ................ | B65G 17/123 |
|           |   |   |         |         |                 | 198/799     |

(Continued)

FOREIGN PATENT DOCUMENTS

| CN | 202743839 | 2/2013 |
| CN | 107600865 | 1/2018 |

(Continued)

*Primary Examiner* — Gene O Crawford
*Assistant Examiner* — Keith R Campbell
(74) *Attorney, Agent, or Firm* — Schmeiser, Olsen & Watts LLP

(57) ABSTRACT

An apparatus (10, 60) for storage of elongate elements, such as pipes, tubes and conduits. The apparatus (10, 60) includes a frame (12) that supports a plurality of trays (15, 63). The trays (15, 63) are arranged in two vertical columns of storage positions, except for the trays located at the top or bottom of the apparatus as they are moved about sprockets (71, 72) by a drive motor (73). Each tray (15, 63) is configured to support a plurality of elongate items. The trays (15, 63, which may embodied as cradles or racks, may be moved between a storage position and an access position, wherein in the access position, the elongate items can be accessed from substantially vertically above the tray (15, 63).

8 Claims, 11 Drawing Sheets

(51) Int. Cl.
 *B65G 1/04* (2006.01)
 *B65G 17/18* (2006.01)
 *B65G 17/48* (2006.01)

(52) U.S. Cl.
 CPC ........... *B65G 1/0457* (2013.01); *B65G 17/18* (2013.01); *B65G 17/485* (2013.01); *B65G 2201/0217* (2013.01); *B65G 2201/0276* (2013.01); *B65G 2207/46* (2013.01)

(58) Field of Classification Search
 CPC .......... B65G 17/485; B65G 2201/0217; B65G 2201/0276; B65G 2207/46
 See application file for complete search history.

(56) References Cited

U.S. PATENT DOCUMENTS 3,537,768 A * 11/1970 Anders ................ A47B 63/067
 312/266
3,613,927 A * 10/1971 Carlier .................. B65G 47/57
 414/592
4,801,236 A * 1/1989 Katzenschwanz ..... B65G 1/127
 198/483.1

FOREIGN PATENT DOCUMENTS

| JP | H02180120 | | 7/1990 |
| JP | H02180120 A | * | 7/1990 |
| JP | H0439203 | | 2/1992 |

* cited by examiner

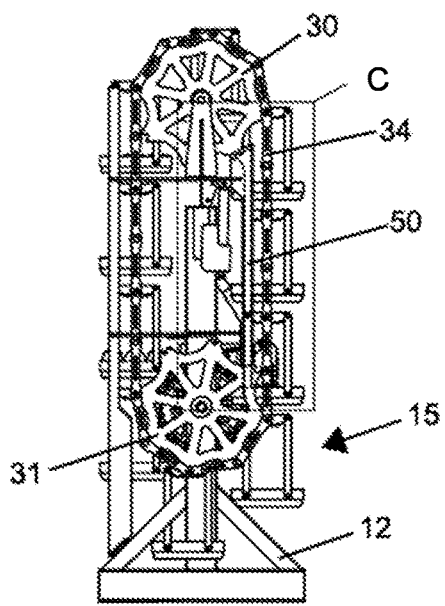
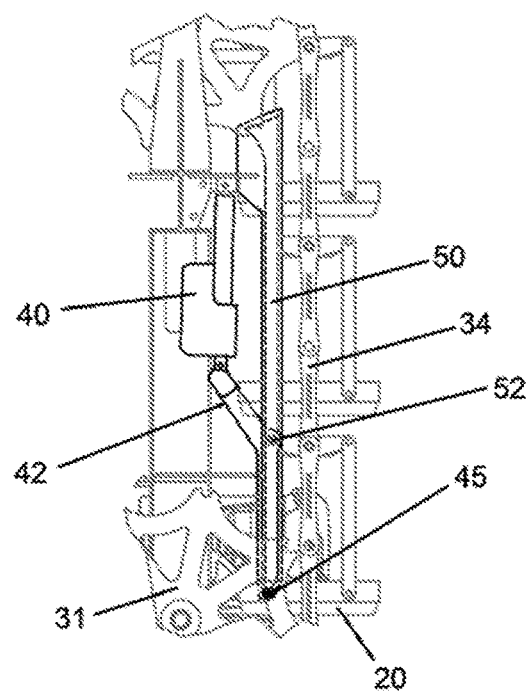
Figure 7
Figure 8
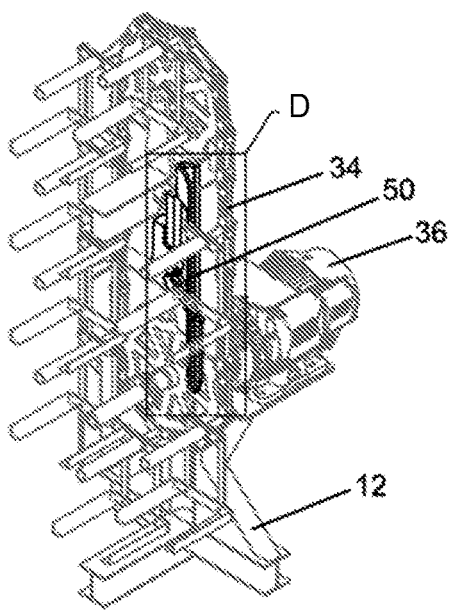
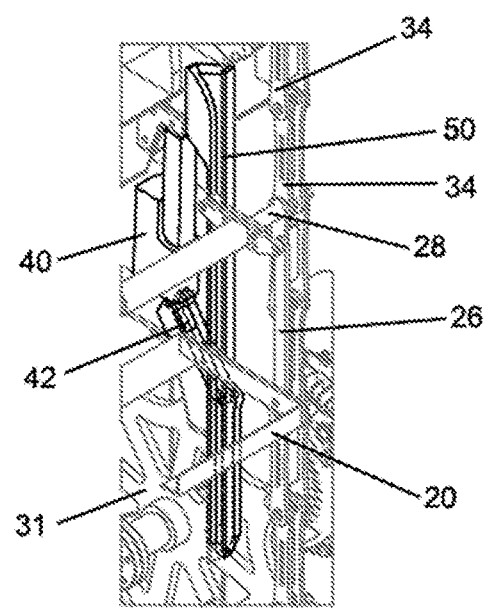
Figure 9
Figure 10

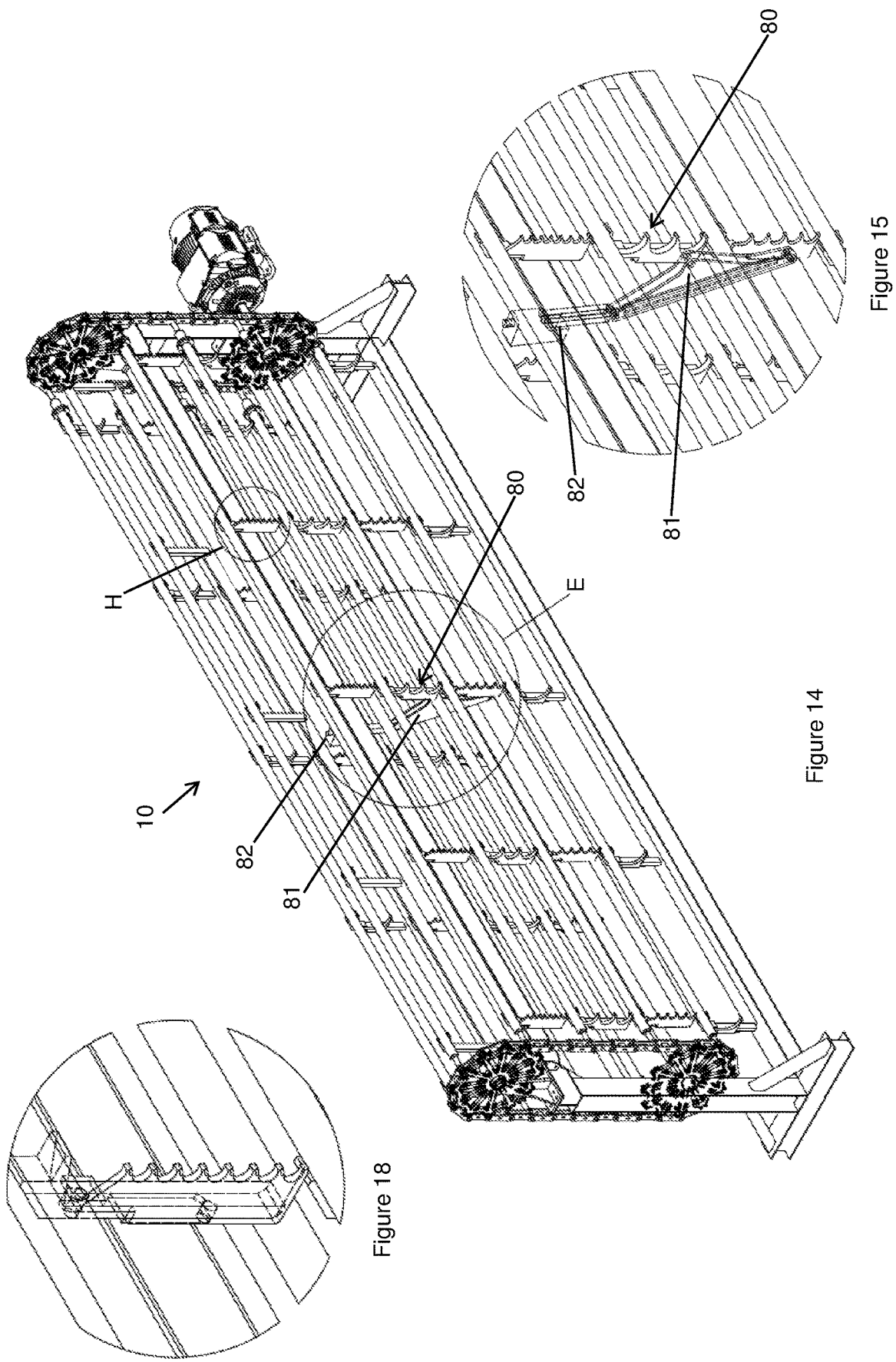

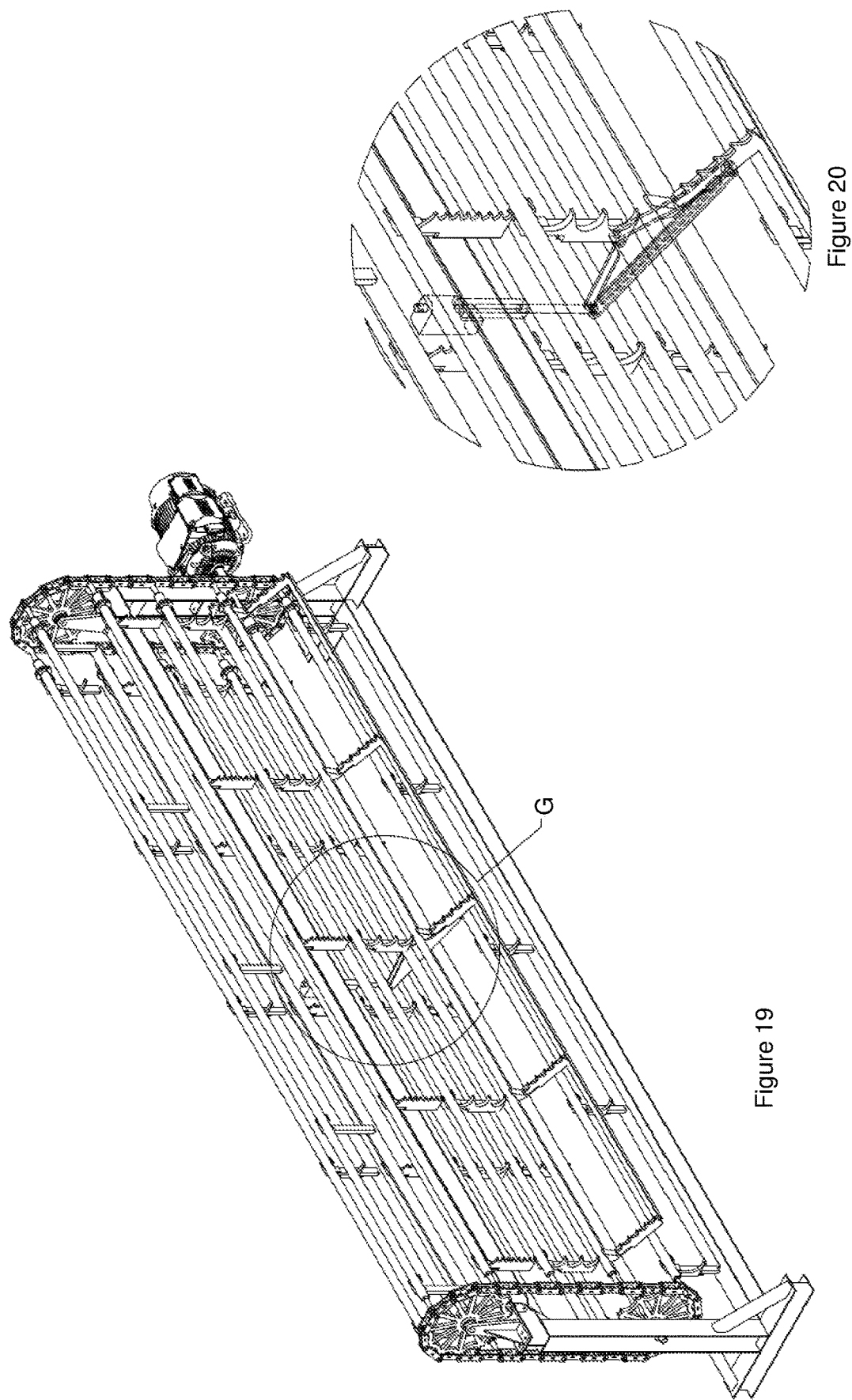

STORAGE APPARATUS

TECHNICAL FIELD

The present invention generally relates to a storage apparatus and more specifically to a storage apparatus that is suitable for supporting elongate items, such as but not limited to pipes or rods.

BACKGROUND

Elongate items such as pipes, rods, wires and other long items are used in a very wide range of industries for a variety of purposes. For example, rods are used in a range of manufacturing scenarios, as are pipes. Pipes are also used in situations outside a workshop, such as for installing in the ground to carry water or gas. These items when not in use may be stacked or bundled, but are generally difficult to manage and access when required.

One method of storing these items in a workshop may be on a rack or shelf system. This may be satisfactory for storing the items, but will typically not allow for easy access when loading the items initially or later when requiring the items for use. The items will generally be very heavy, requiring the use of a forklift to access the items, for example.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

SUMMARY

The present invention seek to provide a storage apparatus suitable for compactly storing pipes, rods or other elongate items.

The present invention also seeks to provide a storage device which allows easy access to individual pipes, rods or other elongate items.

According to one example aspect, there is provided an apparatus for storage of elongate items, the apparatus comprising a frame that supports a plurality of trays, wherein each of the trays is configured to support a plurality of elongate items.

In one form, each tray is movable between a storage position and an access position.

Preferably, the tray remains coupled to the frame when in the access position.

Also preferably, when a tray is in the access position, any elongate items positioned on the tray can be accessed from substantially vertically above the tray.

In a preferred form, the trays can be in one of a plurality of storage positions, one of which is designated an available position, wherein the tray is moved between the available position and the access position.

Preferably, two or more of the storage positions are located in substantially vertical alignment.

The apparatus preferably includes an actuator that is configured to engage a tray and move the tray between the available position and the access position.

Preferably, the actuator includes an arm that is pivotally mounted to the frame, one end of the arm being configured to engage one of the trays and the other end being connected to a drive mechanism.

In a preferred embodiment, the frame includes two rotating members that support the trays, wherein the trays are free to rotate relative to the rotating members such that the orientation of the trays remains constant as the rotating member moves.

Preferably, each of the rotating members includes a chain or belt connected to the frame by one or more sprockets or wheels.

Also preferably, rotation of the chain or belt moves the trays between the storage positions and the available position.

In a preferred embodiment, each of the rotating members is a chain connected to the frame by two sprockets mounted in a vertical configuration.

Preferably, the apparatus is configured to fit inside an intermodal container.

Also preferably, the elongate items are lengths of pipe, tubes, or conduit.

In a preferred embodiment, each tray includes a cradle connected at each end by a linkage system, wherein the linkage system includes two arms arranged substantially parallel to one another, such that the cradle is supported in a substantially horizontal orientation and remains substantially horizontal during movement between the available position and the access position.

Preferably, the apparatus further includes a guide that cooperates with the linkage system to maintain the substantially horizontal orientation of the cradle.

Also preferably, the guide cooperates with the linkage system to maintain the substantially horizontal orientation of the cradle in at least some of the storage positions in addition to the available position.

In a preferred embodiment, each tray includes a protrusion that is engaged by the actuator.

In another preferred embodiment, each tray includes a rack, wherein in the storage position, each tray hangs in a substantially vertical orientation.

In this preferred form, each rack preferably includes a plurality of spaced apart coupling arms, each coupling arm having at least one notch configured to support at least one elongate item.

Preferably, each notch includes a lip configured to retain said elongate item in said notch.

In a preferred form, the apparatus includes a push arm, configured to engage a rack when in the available position and rotate or move it to an access position wherein the rack is outwardly angularly disposed.

In this preferred form, the push arm is actuated by a hydraulic cylinder.

BRIEF DESCRIPTION OF FIGURES

The present invention will become more fully understood from the following description of preferred but non-limiting embodiments thereof, which are given by way of example only, described in connection with the accompanying drawings, wherein:

FIG. 7 illustrates an end view of the storage apparatus from FIG. 1 with the a tray retracted to an available position;

FIG. 8 illustrates an enlarged portion of FIG. 7 as designated by Detail C;

FIG. 9 illustrates an isometric view of an end portion of the storage apparatus from FIG. 1 with a tray retracted to the available position;

FIG. 10 illustrates an enlarged portion of FIG. 9 as designated by Detail D;

FIG. 14 illustrates the apparatus of FIG. 12, but indicating some additional details;

FIG. 15 illustrates an enlarged portion of FIG. 14 as designated by Detail E;

FIG. 18 illustrates an enlarged portion of FIG. 14 as designated by Detail H;

FIG. 19 illustrates the apparatus of FIG. 13, but showing some additional details;

FIG. 20 illustrates an enlarged portion of FIG. 19 as designated by Detail G;

DETAILED DESCRIPTION

Figure 1:
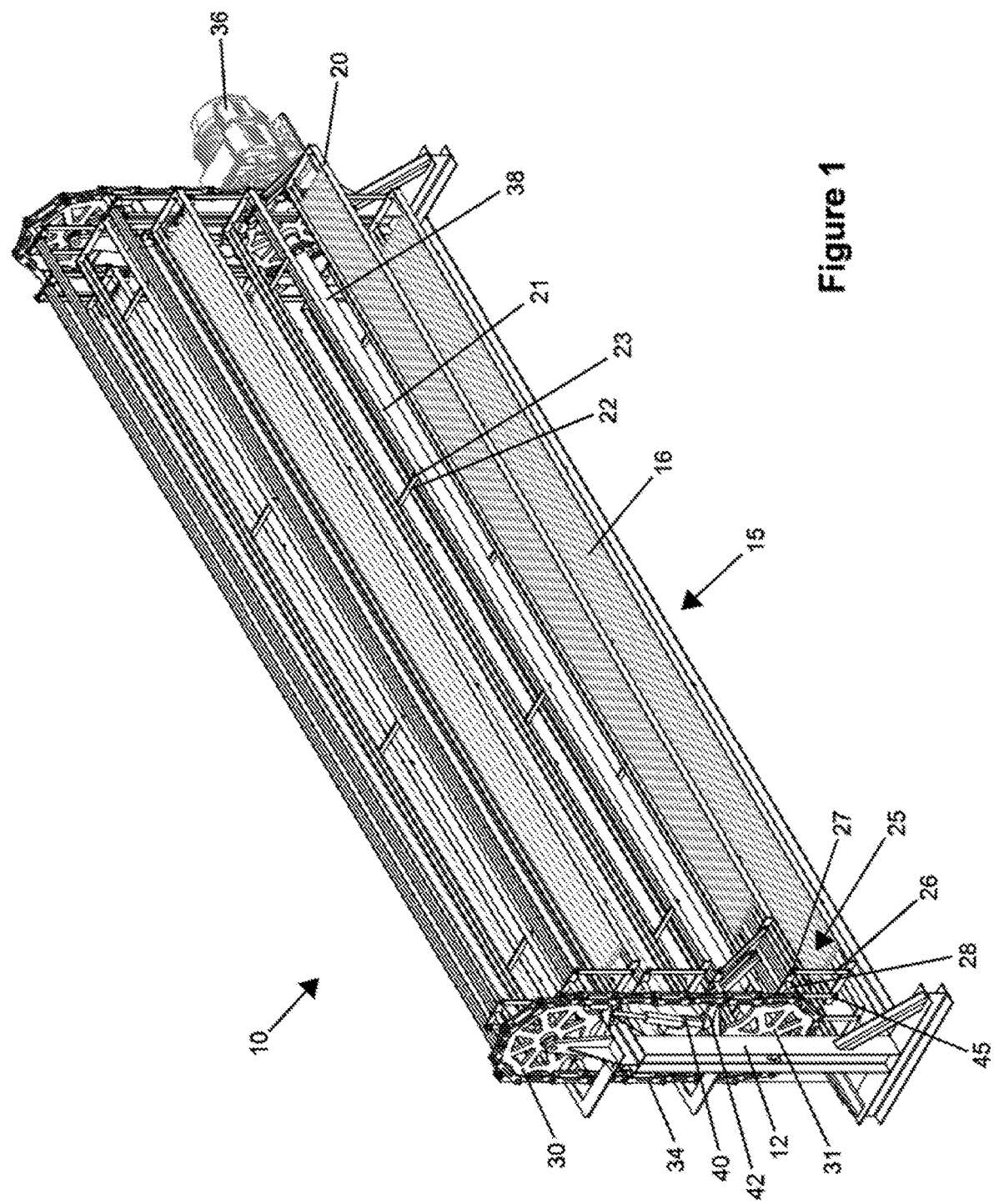
FIG. 1 illustrates an isometric view of a storage apparatus according to one embodiment of the invention, where one tray is extended out to an access position.

The following modes, given by way of example only, are described in order to provide a more precise understanding of the subject matter of a preferred embodiment or embodiments.

In the Figures, incorporated to illustrate features of example embodiments, like reference numerals are used to identify like parts throughout the Figures.

A first embodiment of the invention will firstly be described with reference to FIGS. 1 to 11, whilst a second embodiment of the invention will thereafter be described with reference to FIGS. 12 to 22.

Firstly, referring to FIG. 1, there is shown an apparatus 10 with a frame 12 supporting a number of trays 15. Each of the trays can hold a number of pipes 16 or other similar elongate items. Each tray 15 includes a cradle 20 with an outer frame 21 and cross members 22 on which the pipes 16 can be supported. The cross members 22 include notches 23 to prevent the pipes 16 from moving once placed on the cradle 20.

Each cradle 20 is supported at each end by a linkage system 25 that includes two parallel arms 26. The arms 26 are pivotally connected at a lower end to the cradle 20 and pivotally connected at an upper end to an upper linkage arm 27. A rod 28 supports the upper linkage arm 27 at a central location thereof.

The rod 28 is fixed to the upper linkage arm 27 but is mounted so that it is free to rotate, such that it allows the upper linkage arm 27 to pivot about the axis of the rod 28. The rod 28 extends the full length of the tray 15 to connect the upper linkage arms 27 at each end of the tray 15 and fixing them relative to one another. This is an advantageous feature because it aids in supporting the stability of the trays 15, however in alternative embodiments it may be desirable to remove this connection between the upper linkage arms 27.

At each end of the apparatus 10 there is an upper sprocket 30 and a lower sprocket 31 rotatably mounted to the frame 12. A chain 34 is fitted about the sprockets so that rotation of the lower sprocket 31 by a motor 36 causes rotation of the chain 34 and the upper sprocket 30. The lower sprockets 31 are connected by an axle 38, so that when the motor 36 operates, all of the sprockets 30, 31 and chains 34 rotate together.

Each tray 15 is suspended from the chain 34 by the rods 28 that are each inserted to a join of links of the chain 34. As the chain 34 rotates, the trays 15 are suspended by the rods 28 so that the cradles 20 hang below the rods 28 and maintain a substantially horizontal orientation.

There is no axle connecting the upper sprockets 30, which allows the rotation to occur without interference with the trays 15 as they move through the space between the upper sprockets 30. Due to the trays 15 hanging in this way, however, they are free to pass below the axle 38 that connects the lower sprockets 31.

Referring to FIG. 7, the apparatus 10 has a relatively compact configuration, with the trays 15 arranged largely in two vertical columns of storage positions. In addition, however, some of the trays 15 are in storage positions located at the top or bottom of the apparatus somewhere between the two columns as they are moved around the sprockets 30, 31 between these two columns. As the sprockets 30, 31 and chain 34 rotate the trays 15 are moved between the various storage positions.

Figure 2:
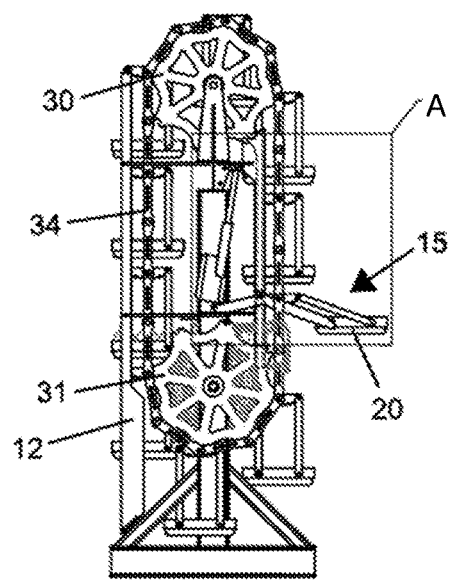
FIG. 2 illustrates an end view of the storage apparatus from FIG. 1 with a tray extended out to the access position.

One specific storage position is designated as an available position, where the tray 15 that is located in that position can be moved outwardly from the available position to an access position. FIG. 2, for example, shows a tray 15 extending outwardly in the access position. In contrast, FIG. 7 shows this same tray retracted inwardly, so that it is in the storage position that is designated as the available position.

The outer location of the cradle 20 when in the access position is advantageous because it facilitates loading or unloading of pipes 16 to or from the cradle 20. In particular, FIG. 2 illustrates that access to the cradle 20 when in the access position is possible from vertically above the cradle 20, thereby permitting use of a crane for loading or unloading, for example.

Movement of the tray 15 between the available position and the access position will now be described in more detail. During this movement, the tray 15 remains coupled to the apparatus 10, but the linkage system 25 permits the cradle 20 to pivot outwardly and upwardly. For reference, FIGS. 1 to 6 all show the apparatus 10 with a tray 15 in the access position, while FIGS. 7 to 11 all show the apparatus 10 with this tray 15 returned to the available position.

Figure 3:
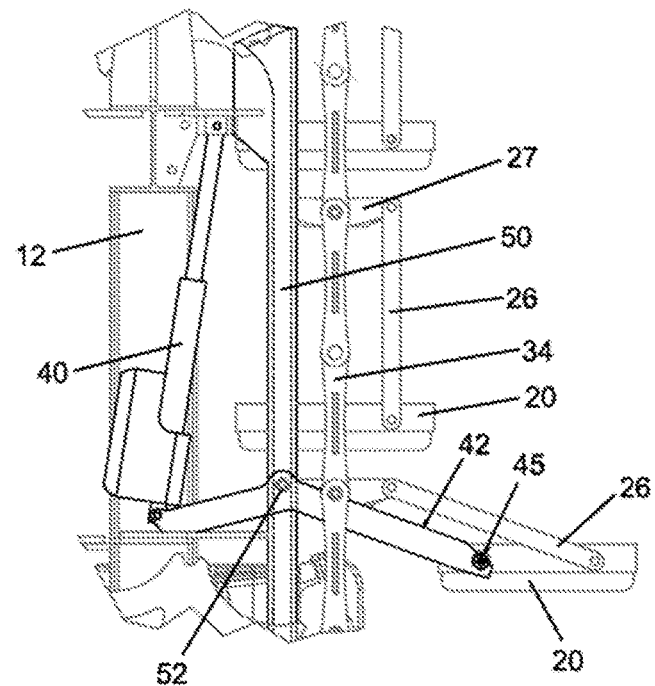
FIG. 3 illustrates an enlarged portion of FIG. 2 as designated by Detail A.
Figure 4:
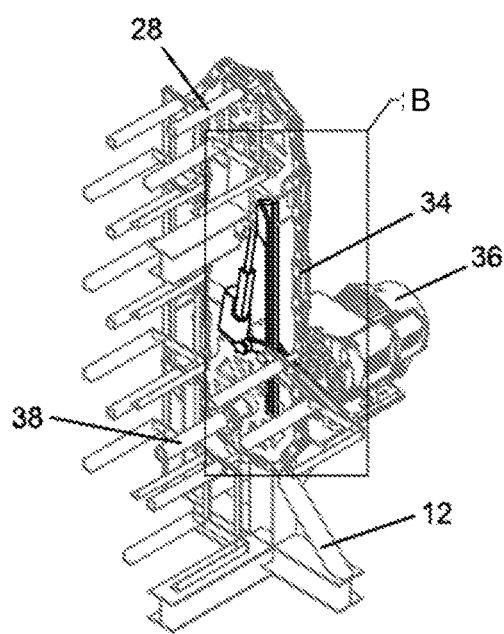
FIG. 4 illustrates an isometric view of an end portion of the storage apparatus from FIG. 1 with a tray extended out to the access position.
Figure 5:
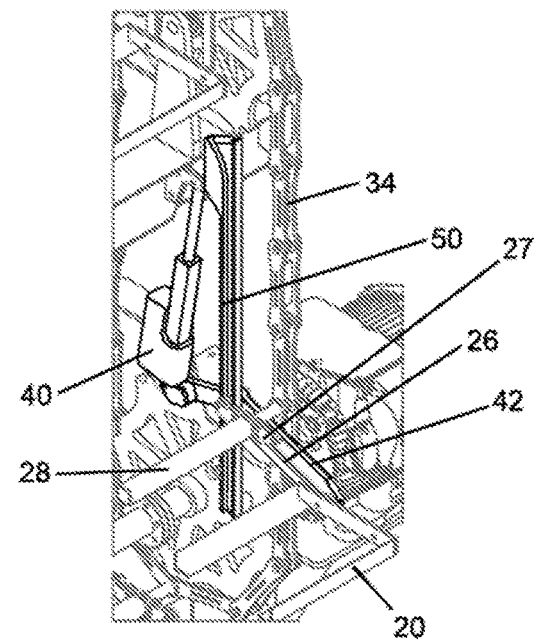
FIG. 5 illustrates an enlarged portion of FIG. 4 as designated by Detail B.
Figure 6:
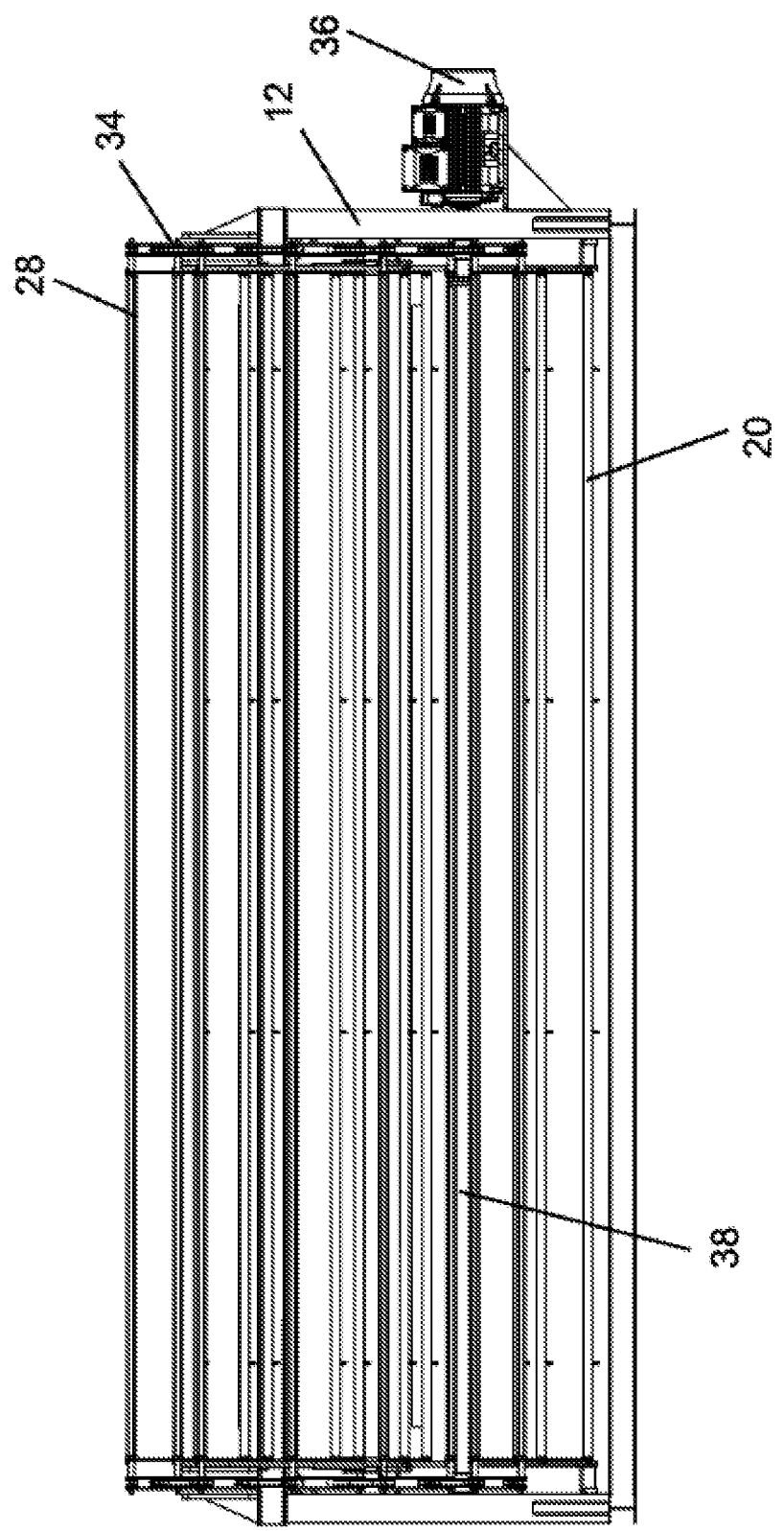
FIG. 6 illustrates a front view of the storage apparatus from FIG. 1 with a tray extended out to the access position.
Figure 11:
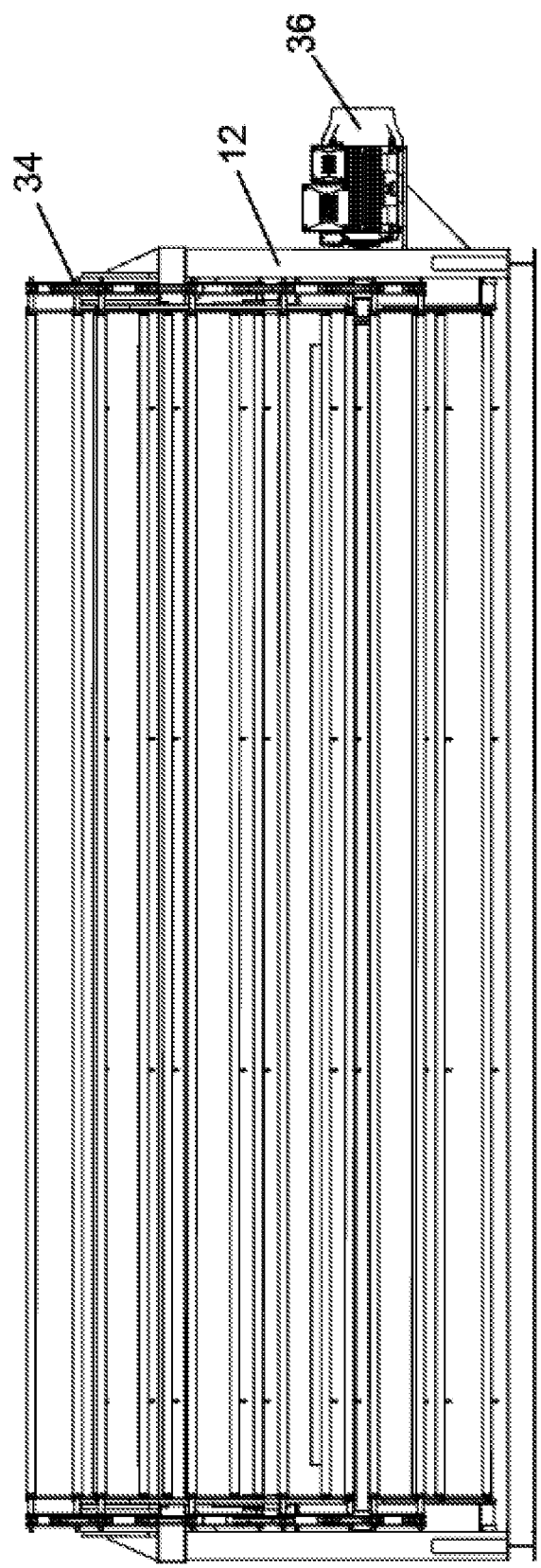
FIG. 11 illustrates a front view of the storage apparatus from FIG. 1 with a tray retracted to the available position.

Referring to FIG. 3, a drive mechanism 40 is connected at an upper end to the frame 12 and at a lower end to an arm 42. The arm 42 is pivotally mounted at an intermediate point to the frame 12. The arm 42 is configured so that the end on the opposite side of the mounting point to the drive mechanism 40 can abut a protrusion 45 extending from the end of the cradle 20. As the drive mechanism 40 extends, it causes the arm 42 to pivot, contacting the protrusion 45 and pushing the cradle 20 outwardly.

As the cradle 20 is urged outwardly, the parallel arms 26 of the linkage system 25 cause the cradle 20 to maintain its horizontal orientation. The cradle 20 is supported in a substantially horizontal orientation and remains substantially horizontal throughout this movement between the available position and the access position.

When the cradle 20 is returned to the available position, the motor 36 can rotate the sprockets 30, 31, chain 34 and trays 15 so that a different tray 15 is moved into the available position, which may then be moved to the access position if desired as described above with the arm 42 engaging the new tray 15.

The drive mechanism 40 in the embodiment shown is an electric linear actuator, but may take any other suitable form in other embodiments. Examples of suitable other forms of drive mechanism include, but are not limited to, hydraulic actuators, pneumatic actuators, other electric actuators and mechanical systems, including both linear and non-linear actuators.

A guide 50 is provided as part of the frame 12 to cooperate with the linkage system 25 to maintain the horizontal orientation of the cradle 20 in at least some of the storage positions in addition to the available position and the access position. This is achieved in two ways.

Firstly, the upper linkage arm 27 includes a roller 52 that moves along the guide 50. The vertical portion of the chain 34 is parallel to the guide 50, so that the interaction of the roller 52 with the guide 50, together with the fixed position of the rod 28 relative to the chain 34, ensures the upper linkage arm 27 is held in a horizontal position. This in turn ensures the cradle 20 is held in a horizontal orientation, due to the configuration of the parallel arms 26.

Secondly, the protrusion 45 of the embodiment shown is also in the form of a roller, which interacts with the guide 50 when the tray 15 is in at least some of the storage positions. This ensures that the cradle 20 is positioned vertically underneath the upper linkage arm 27 and cannot hang to one side or swing inwardly and outwardly on the parallel arms 26.

The guide 50 ensures that the upper linkage arm 27 stays horizontal and the tray 15 hanging vertically during movement between the different storage positions, which may not always be the case, such as due to uneven weight distribution in the tray 15 or swinging trays 15 caused by the movement thanks to the motor 36 or external forces. The guide 50 is important to ensure there are no accidental collisions of trays 15 on opposite sides of the apparatus 10 if the trays 15 happen to be loaded in a way that causes them to lean inwardly.

The guide 50 has a wide entrance, or what may also be described as a Y opening or similar. When the trays 15 pass over the top of the upper sprocket 30 or under the bottom of the lower sprocket 31, the rollers 52 are then received into the guide 50 again even if the roller 52 does not align exactly with the guide 50.

The protrusion 45 can be moved outwardly away from the guide 50 when in the available position, but is thereafter also received in the guide 50 when it is moved beyond the available position where it aids in maintaining vertical alignment of the tray 15 as described above.

Referring to FIGS. 3 and 8, it can be seen that the actuating arm 42 is mounted to the guide 50 in a position that corresponds with the location of roller 52 and also the upper end of the inner one of the parallel arms 26 when the tray 15 is in the available or access positions. The protrusion 45 is located at the lower end of the inner parallel arm 26.

This configuration allows the arm 42 to follow the same path as the inner parallel arm throughout the movement between the available and access positions. This in turn allows the protrusion 45 to be in contact with the arm 42 without any relative movement throughout the range of motion of the tray 15.

While this configuration may be advantageous, it will be appreciated that it is not essential. In particular, in embodiments where the protrusion 45 is a roller, it would be possible for the point of contact between the protrusion 45 and the arm 42 to change during the movement.

The Figures only show a guide 50 on the side of the apparatus 10 where the available position is located, however a second guide 50 can optionally be also included on the other side of the apparatus 10.

An alternative but also preferred embodiment of the apparatus will now be described with reference to FIGS. 12 to 24.

In this alternative embodiment, instead of the trays being configured in the form of hanging cradles which maintain a substantially horizontal orientation, as per the embodiment shown in FIGS. 1 to 11, the trays are embodied in the form of racks which, in their retracted or storage positions, each maintain a substantially vertical orientation.

Figure 12:
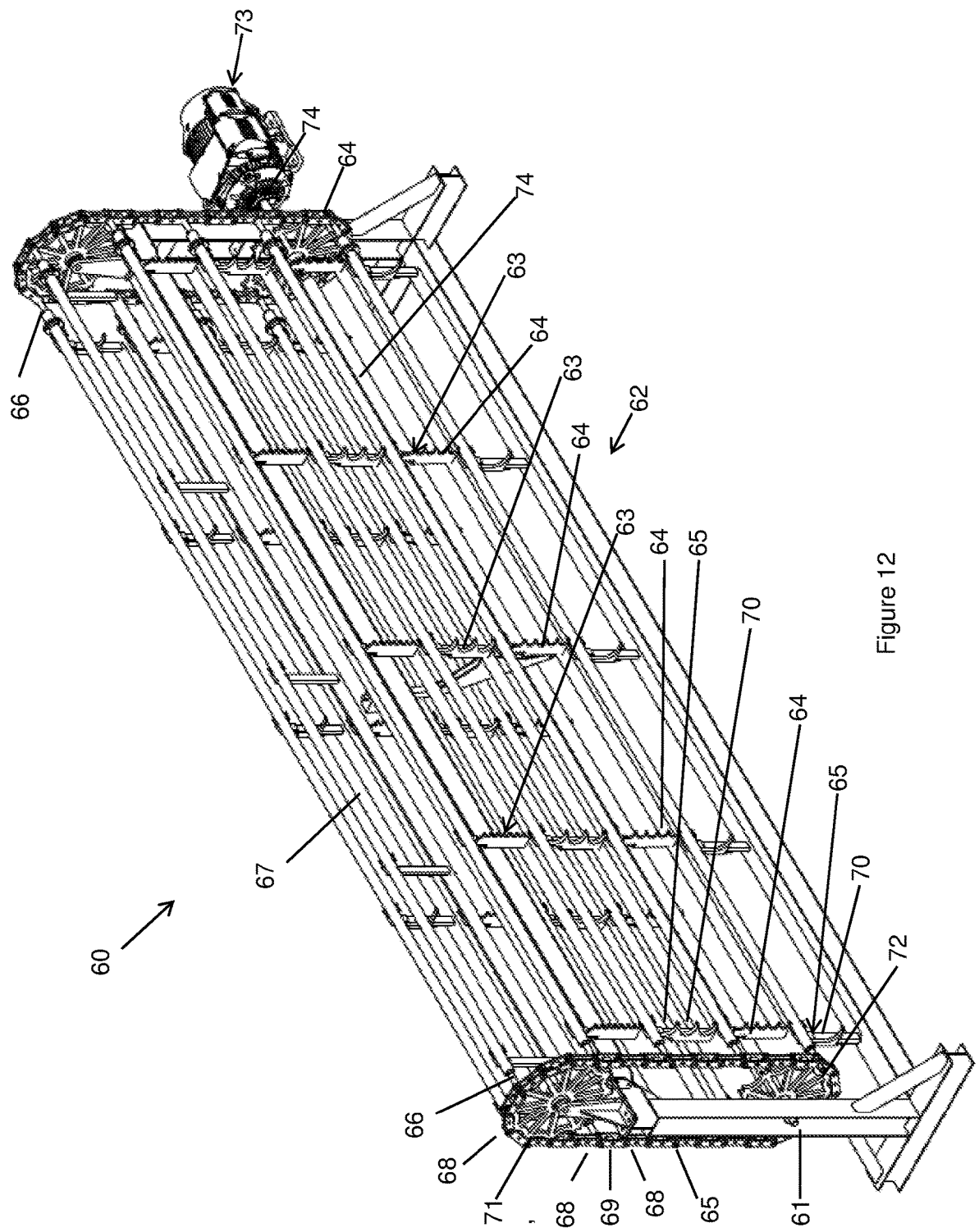
FIG. 12 illustrates an isometric view of a storage apparatus according to a second embodiment of the invention, with the racks in the storage position.
Figure 13:
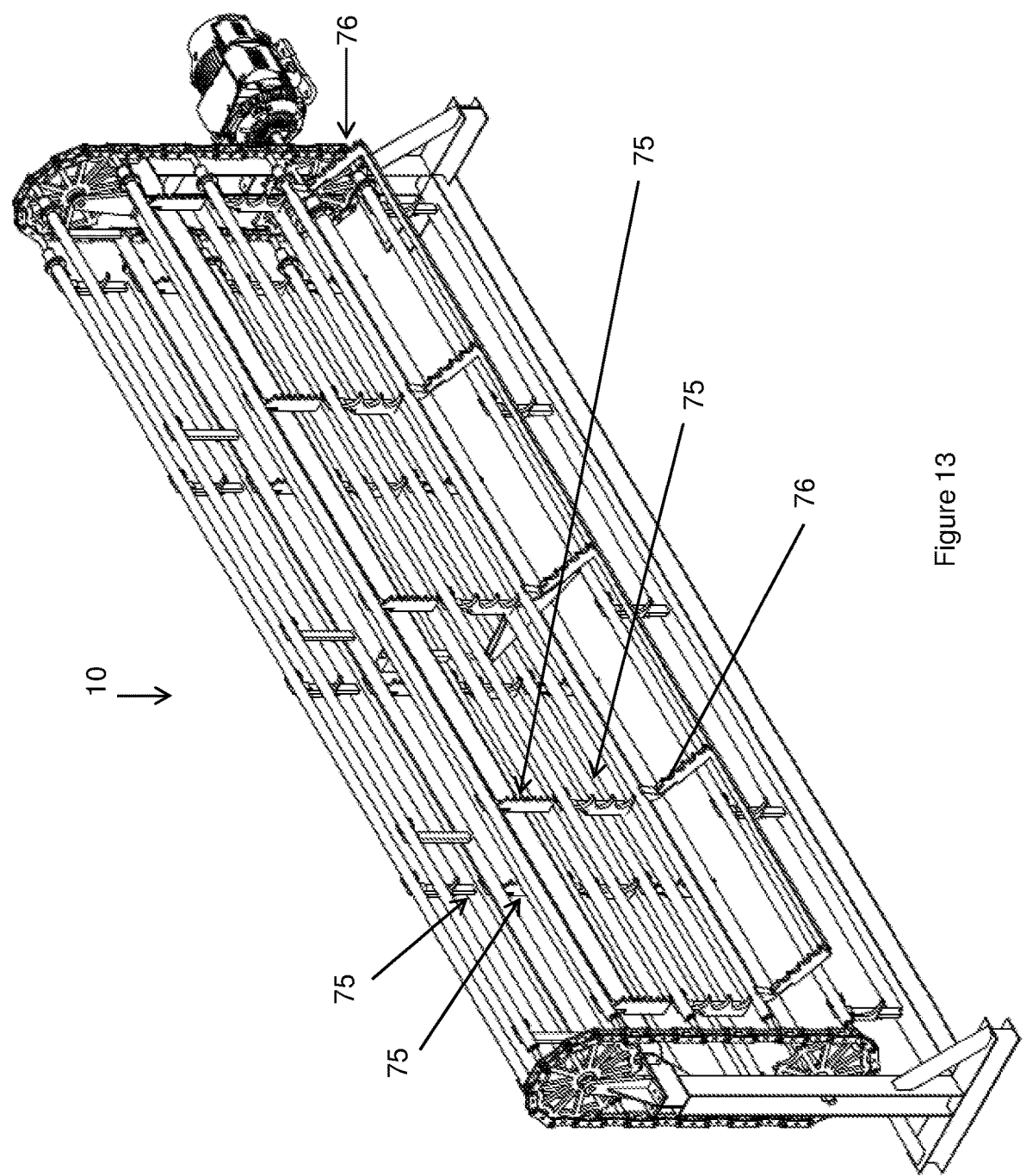
FIG. 13 illustrates another isometric view of the storage apparatus of the embodiment shown in FIG. 12, with one of the racks extended out to its access position.

Referring to FIG. 12, there is shown an apparatus 60 with a frame 61 supporting a plurality of trays 62. Each of the trays 62 can hold a number of pipes, rods, or other elongate items. Each tray 62 is embodied in the form of a rack arrangement 63 on which pipes or rods can be supported.

Each rack arrangement 63 includes a plurality of spaced apart coupling arms 64, each coupling arm in the rack 63 having at least one notch 65 to engage and support the elongate item along its length.

An upper end of each coupling arm 64 in each rack arrangement 63 is suspended from a rod 67. Each end 66 of each rod 67 is operatively engaged with, such as being inserted into, a join 68 of the links 69 of each chain 65. The rods 67 are configured to rotate relative to their ends 66 which engage with the chains 65, such that the racks 63 can hang and maintain a substantially vertical orientation as the chains 65 rotate.

The pipes, rods or other elongate items are retained in the notches 65 of each coupling arm 64 as each notch may be provided with a lower lip 70 which is upturned to a sufficient extent such that the elongate item is retained in the notch 65 and does not slip over or past the lip 70. Additional locking mechanisms may however be incorporated in certain situations, if desired, such as when the apparatus 60, loaded with elongate items, is being transported and the elongate items stored therein may be prone to vibration or shaking out of the notches of the racks.

Referring to FIG. 12, the apparatus 60 has a relatively compact configuration, with the racks 63 being arranged largely in two vertical columns of storage positions, except for the racks located at the top or bottom of the apparatus as they are moved around the sprockets 71 and 72 between these two columns.

As per the embodiment of FIGS. 1 to 11, the apparatus 60 may be driven by a drive motor 73 driving the lower sprockets 72 which are connected by axle 74. The chain 65 rotates the upper sprockets 71 and moves the racks between the various storage positions.

When it is desired to remove a rod, pipe or other elongate item from the apparatus 60, the rack 63 holding the respective elongate item is defined to be in an available position, whereby it is appropriately positioned and ready to be moved to an access position.

Movement of a rack 63 from an available position to an access position will now be described with particular reference to FIGS. 14 to 22.

FIGS. 14 to 18 show various views and details of the apparatus 60 in the storage position, whilst, FIGS. 19 to 22 show various views and details of the apparatus 60 in the access position.

Figure 17:
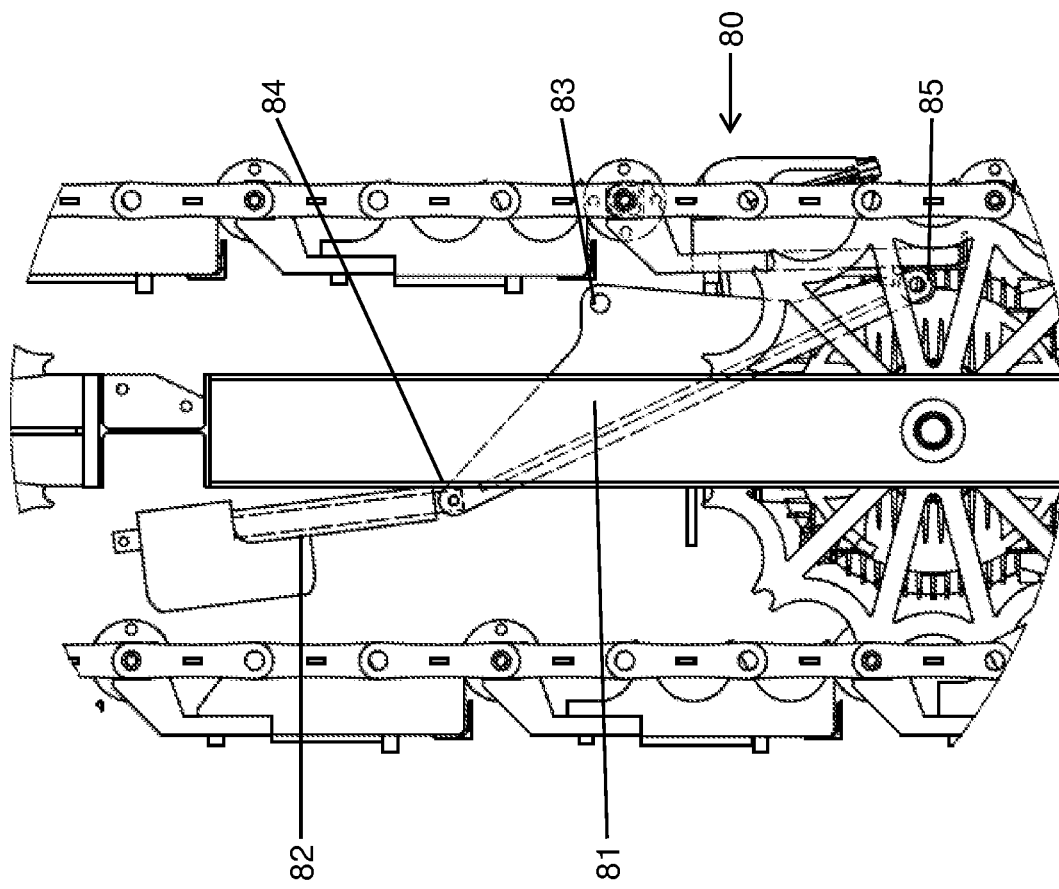
FIG. 17 illustrates an enlarged portion of FIG. 16 as designated by Detail F.
Figure 16:
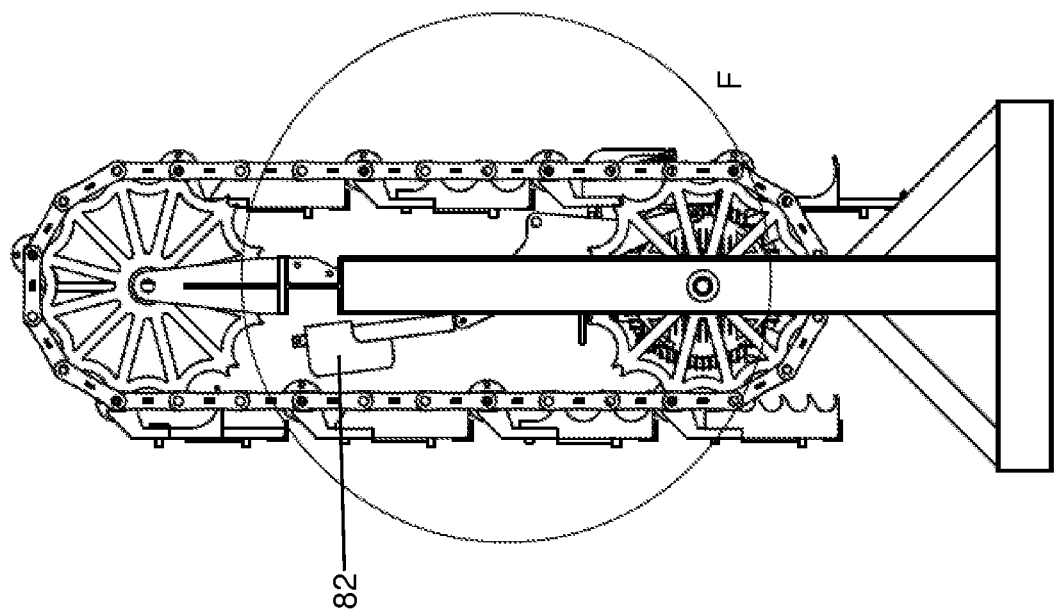
FIG. 16 illustrates a side view of the second embodiment with all the racks retracted in their storage positions.
Figure 22:
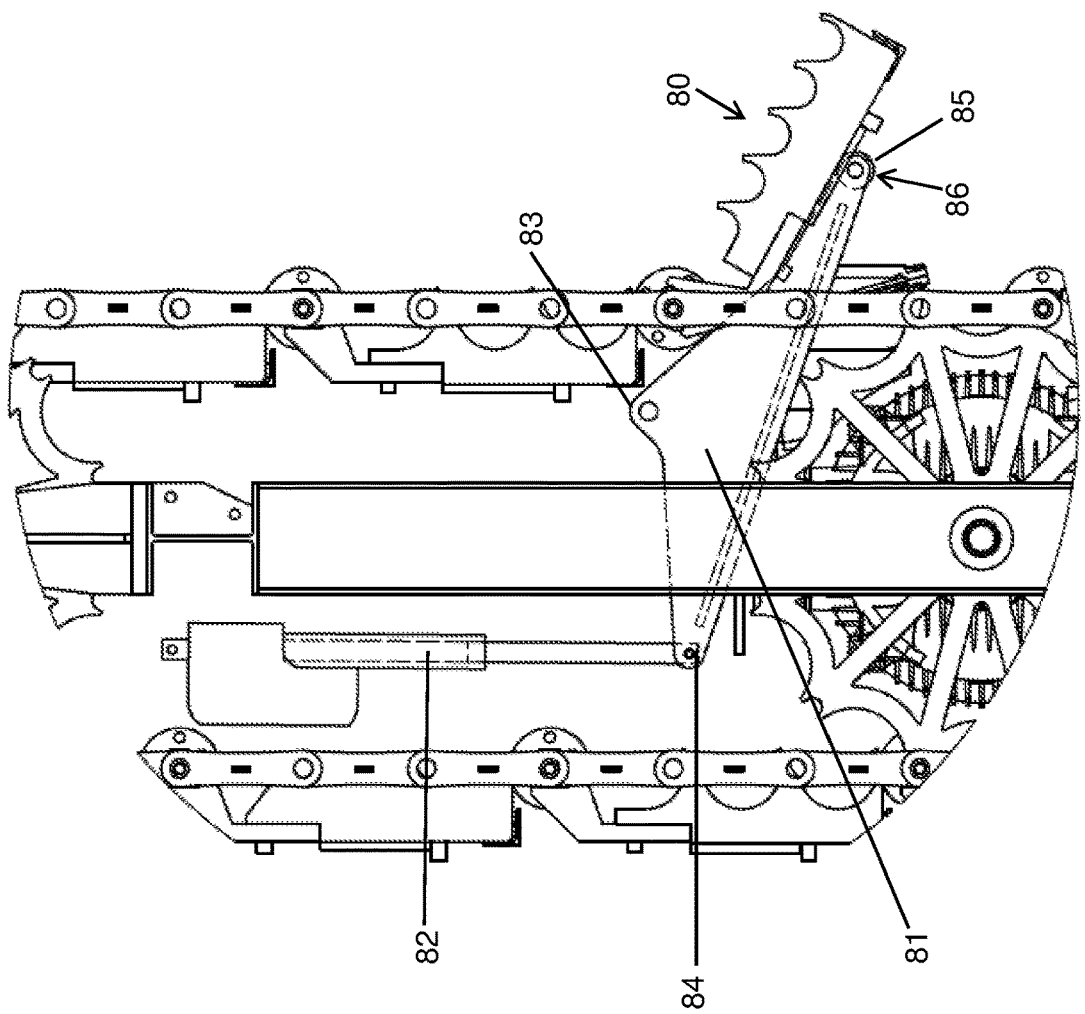
Figure 21:
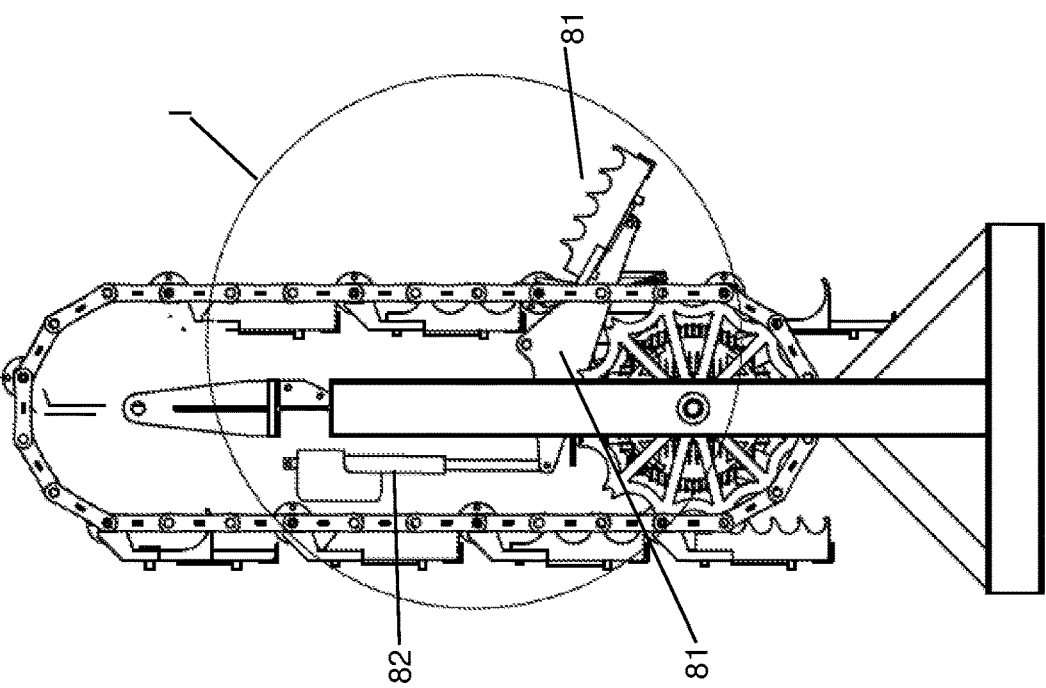
FIG. 21 illustrates a side view of the second embodiment of the invention with a rack in the access position; and, FIG. 22 illustrates an enlarged portion of FIG. 22 as designated by Detail I.

FIG. 15 details one of the racks, which may be described as the available rack 80, shown in the available position and ready for movement into the access position. An elevational view of this same available position is also shown in FIG. 16, with FIG. 17 showing detail F from FIG. 16.

As can be seen in FIGS. 14 to 18, the available rack 80 is stopped in position such that it is adjacent to push arm 81. The push arm 81, driven by drive mechanism 82, which is shown in the example as being embodied as a hydraulic drive cylinder, can then cooperate with the available rack 80 and be moved from its storage position to its access position.

The push arm 81 is adapted to pivot the rack 80, such that it is moved from its hanging position, as shown in FIGS. 14 to 17, to an access position whereby the rack 80 is outwardly angularly outwardly disposed, as illustrated in FIGS. 19 to 22.

In this outwards position, as shown in FIGS. 19 to 22, rods, pipes or other elongate items may be readily loaded or unloaded onto or removed from the rack 80, for instance using an overhead crane or the like.

The push arm 81 is shown to be a substantially triangular shaped member, with a first one of vertices or corners of the triangle being pivotally connected to the frame of the apparatus 10 at pivot point 83. A second of the vertices 84 is pivotally attached to the drive mechanism 82, the other end of the drive mechanism 82 being attached to the frame of the apparatus 10. The third of the vertices 85 of the triangular shaped push arm 81 is adapted to engage the rack 80, and may include a roller 86 thereon which is adapted to push against the rack 80.

As the drive 82 is operated, by extending the hydraulic drive cylinder 82, the push arm 81 rotates about pivot point 83. The roller 86 on the end of the push arm 81 engages with the rack 80 and the rack then rotates outwards, to the position shown in FIGS. 19 to 22.

The embodiment illustrates in FIGS. 14 to 22 shows a single push arm 81 positioned intermediate the ends of the apparatus 10 to effect the movement of the rack 80 between the storage and access positions, however it will be appreciated that one than one such push arm may be preferable, particularly when heavy loads may be provided on the apparatus. It will also be appreciated that alternative types of mechanisms may be embodied to pivot the racks into the access positions, which may, for example be electrically driven or manually operated.

In FIG. 18 is detailed the bar coupling arrangement which may be embodied in the present invention, this being the coupling arrangement encircled as detail F in FIG. 14. It will be appreciated by persons skilled in the art that alternative coupling arrangements, other than providing notches with extended bottom lips thereon, may be alternatively embodied to ensure the engagement of the rods, pipes or other elongate items into the notches of the racks.

While the embodiment shown in the Figures uses a chain 34 with the sprockets 30, 31, in alternative embodiments the chain may be replaced with other suitable devices, such as but not limited to a belt, cable or other flexible tether or linked device. It will be appreciated that such other devices may also require the use of alternative sprockets or wheels.

The frames 12 and 62 preferably include a mechanism for tensioning the chains 34 and 65, respectively. It will be appreciated by those skilled in the art that sufficient tension in the chains 34 and 65 is important for supporting the upper linkage arm 27 in the horizontal position.

Each of the apparatus 10 and 60 of the preferred embodiments is preferably sized to fit inside an intermodal freight container, or shipping container. During use, however, the apparatus 10 and 60 may be secured permanently to a surface, such as being bolted to the floor in a manufacturing facility or a workshop.

Alternatively, the apparatus 10 may be sized to fit on the back of a truck or other vehicle, where it may be removably or permanently fixed. In yet other alternative embodiments, the apparatus 10 may be any other suitable size to fit particular desired elongate items.

While the Figures and this description refer to pipes, it will be appreciated that the invention is not limited to pipes, but may be suited to hold many other elongate items, such as but not limited to bars, rods, conduits, wires and beams of various cross sectional shapes, both hollow and solid.

The pipes 16 in the preferred embodiment are held in place by the notches 23, but in other embodiments they may be free to roll. In particular, the notches 23 would not be required if the pipes 16 or alternative elongate items are not round. It may also be preferable to omit the notches 23 in some or all of the trays 15 if it is desired to use different sized elongate items from time to time.

Also, whilst the description and drawings refer to trays, it should be understood that this term, throughout this specification, is intended to have broad definition, and encompasses a cradle, a rack, or any other carrier which may support or otherwise hold one or more elongate items.

In embodiments where the elongate items are held in place, they may be positioned with a gap to allow individual items to be picked up, such as by placing a strap or chain around, however in other embodiments they may abut one another.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as "front" and "rear", "inner" and "outer", "above" and "below" and the like are used as words of convenience to provide reference points and are not to be construed as limiting terms.

Whilst the present invention has been described with reference to particular embodiments, it will be understood that many modifications will be apparent to those skilled in the art. All such variations and modifications should be considered to fall within the scope of the invention as broadly described and as hereinafter claimed.

The invention claimed is:

1. An apparatus for storage of elongate items, the apparatus including:
   a frame, a pair of spaced apart rotating members mounted on the frame, each rotating member including a chain fitted about an upper and lower sprocket mounted in a substantially vertical configuration, and an axle interconnecting the lower sprocket of each rotating member adapted to be driven by a motor to simultaneously rotate the sprockets and chains together; and a plurality of trays supported by the frame, each tray having notches adapted to support a plurality of elongate items in spaced apart relationship, each tray being suspended from the chain by a rod attached between the chains, whereby, as the chains rotate each tray is free to rotate to thereby hang in one of a plurality of storage positions in which the orientation of the trays remain substantially constant as the rotating members move, each tray being movable to extend outwardly from one of its generally vertically aligned storage positions which is designated as an available position by an actuator, the actuator including an arm which is pivotally mounted to the frame and which is configured to be driven by a drive mechanism to engage a selected tray which is in the available position and move it to an access position in which any elongate items positioned on the selected tray can be accessed from substantially vertically above the tray, and, thereafter retract and return the selected tray to the available position.

2. The apparatus as claimed in claim 1, wherein each tray includes a protrusion adapted to be engaged by the arm of the actuator.

3. The apparatus according to claim 1, wherein the tray remains coupled to the frame when in the access position.

4. The apparatus according to claim 1, wherein the apparatus is configured to fit inside an intermodal container.

5. The apparatus according to claim 1, wherein the elongate items include pipes, bars, wires, or beams.

6. The apparatus according to claim 1, wherein each tray includes a cradle connected at each end by a linkage system, wherein the linkage system includes two arms arranged substantially parallel to one another, such that the cradle is supported in a substantially horizontal orientation and remains substantially horizontal during movement between the available position and the access position.

7. The apparatus according to claim 6, further including a guide that cooperates with the linkage system to maintain the substantially horizontal orientation of the cradle.

8. The apparatus as claimed in claim 1, wherein the drive mechanism includes a hydraulic, pneumatic or electric actuator.

* * * * *